United States Patent

[11] 3,601,664

| [72] | Inventors | John H. Auer, Jr. |
| --- | --- | --- |
| | | Fairport; |
| | | Jerry P. Huffman, Rochester, both of, N.Y. |
| [21] | Appl. No. | 855,523 |
| [22] | Filed | Sept. 5, 1969 |
| [45] | Patented | Aug. 24, 1971 |
| [73] | Assignee | General Signal Corporation |
| | | Rochester, N.Y. |

[54] WHEEL DETECTOR AMPLIFIER
8 Claims, 3 Drawing Figs.

[52] U.S. Cl. .................................................. 317/148.5,
246/247, 317/151
[51] Int. Cl. .................................................. H01h 47/32
[50] Field of Search .......................................... 246/246,
247, 249, 108–123, 108–247; 317/148.5, 141,
142, 151, 156; 330/141; 307/232, 293; 328/109,
129

[56] References Cited
UNITED STATES PATENTS

| 3,114,083 | 12/1963 | Winchel | 317/151 X |
| --- | --- | --- | --- |
| 3,267,388 | 8/1966 | Finkey et al. | 330/141 |
| 3,467,890 | 9/1969 | Mayer | 317/151 X |
| 3,506,881 | 4/1970 | Leary | 317/151 X |
| 2,973,430 | 2/1961 | Pelino | 246/249 |
| 3,086,109 | 4/1963 | Kaehms | 246/247 X |
| 3,486,008 | 12/1969 | Mori | 246/247 X |

FOREIGN PATENTS

| 448,549 | 6/1936 | Great Britain | 317/151 |
| --- | --- | --- | --- |

*Primary Examiner*—Milton O. Hirshfield
*Assistant Examiner*—Ulysses Weldon
*Attorney*—Harold S. Wynn

ABSTRACT: An improved amplifier responsive to wheel detector signals having a timing circuit producing signals relative to the duration of the wheel detector signals. An output stage responsive to the timing circuit signals produces output signals indicative of wheel presence and includes; a buffer for isolating the timing circuit and transmitting the signals, and an output amplifier responsive to the buffer signals having greater than a threshold value for producing the output signals.

WHEEL DETECTOR AMPLIFIER

BACKGROUND OF THE INVENTION

The invention relates to railroad car wheel detector apparatus and in particular to a control circuit for determining true wheel detection signal.

In many railroad applications, accurate wheel presence information is critical. For example, in hot box detection, a wheel detector is used to synchronize the passing axle with the hot box detector scan, and to count the axles for identification of the faulty journal box. Wheel detector apparatus is also used in classification yards as an information gathering device. For example, in the remote control of switches and car retarders, by a central computer, it is essential to have accurate wheel count information so that the computer program dependent upon that information functions properly.

Present wheel detectors include among others, inductive type devices. Such apparatus operates on the principle that a ferromagnetic material, such as a railroad car wheel, when introduced into the field of an inductance coil will alter the field characteristic such that a signal will be produced. The signal is created by an increase in the reluctance of the coil by the introduction of the wheel thereby increasing the field strength, or by blocking the flux produced by one coil which is normally received by another coil.

In the inductive type wheel detector referred to, the signal produced is a function of the speed at which the wheel passes the detector. If the wheel passes quickly, the change in flux in the coil is sharp and a fairly accurate indication is delivered. However, if the wheel passes slowly, the change in flux is slight, yielding an extremely weak and relatively undefined signal. In addition, when inductive type detectors are used, the signal at best is weak and high amplification is necessary.

As previously mentioned, wheel detectors are used in classification yards as information supplying devices to a central computer. In this application, ambient noise transients must not be relayed to the central computer for this would register as a wheel count and introduce error into the control program. The present system is designed to discriminate normally short duration noise pulses from true wheel detector signals.

It is therefore an object of the present invention to provide a simplified wheel detector system.

It is another object of the invention to provide for a more accurate system.

Another object of the invention is to provide a more reliable system using a switch type wheel detector and a simple amplifier of moderate gain.

It is yet another object of the present invention to provide for a system which has the ability to discriminate true signals from ambient noise.

SUMMARY OF THE INVENTION

There has been provided an improved amplifier which is responsive to signals produced by a wheel detector. The improvement includes a timing circuit for producing signals having a magnitude relative to the duration of the signals produced by the wheel detector.

An output stage responsive to the signals produced by the timing circuit is incorporated into the system for producing output signals indicative of wheel presence. The output stage includes, a buffer responsive to the timing circuit for isolating the timing circuit and transmitting the signals, and an output amplifier responsive to the signals for producing output signals only if the signals are of a magnitude greater than a minimum threshold.

BRIEF DESCRIPTION OF DRAWINGS

For a better understanding of the present invention, together with other and further objects thereof, reference is had to the following description taken in connection with the accompanying drawings.

DESCRIPTION OF THE PREFERRED EMBODIMENT

Figure 1:
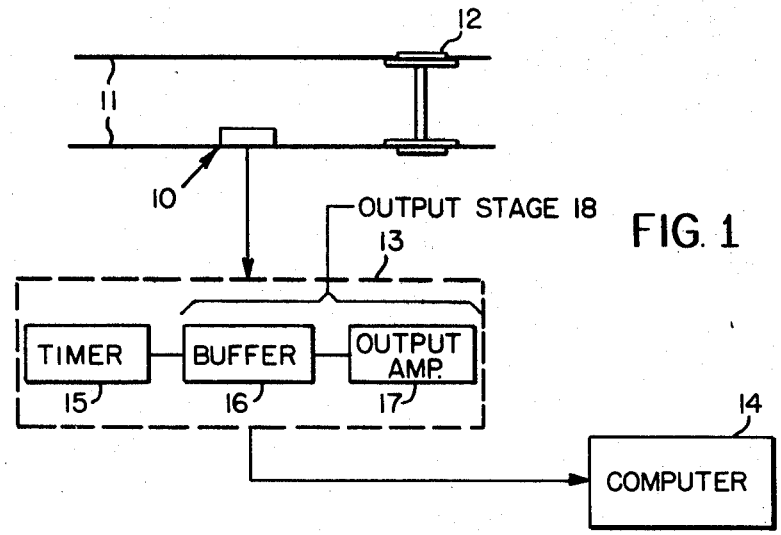
FIG. 1 is a plan view of the system incorporating the amplifier of this invention.

FIG. 1 shows wheel detector 10 mounted adjacent to a track section 11 for detecting the presence of passing railroad car wheels 12. The signal from wheel detector 10 is transmitted to amplifier 13 for discrimination, amplification and transmission to central computer 14. The amplifier 13 consists of two major components including, a timer 15, which receives signals from the wheel detector, integrates the signals and transmits signals to an output stage 18 at a magnitude proportional to time duration of the received signal. The output stage 18 is the second major component of the amplifier 13. It is coupled to the timer 15 and responsive to the signals produced by the timer and generates output signals indicative of wheel presence. The buffer 16 included in output stage 18 is responsive to the timer signals and isolates the timer 15 from an output amplifier 17. The output amplifier 17 included in output stage 18 is a low gain amplifier which is responsive to the signals only of greater than a minimum threshold. The output amplifier 17 transmits the output signals to a central computer 14 for processing. The buffer 16 in addition to isolating the output amplifier 17 from the timing stage 15 provides for proper impedance matching.

Figure 2:
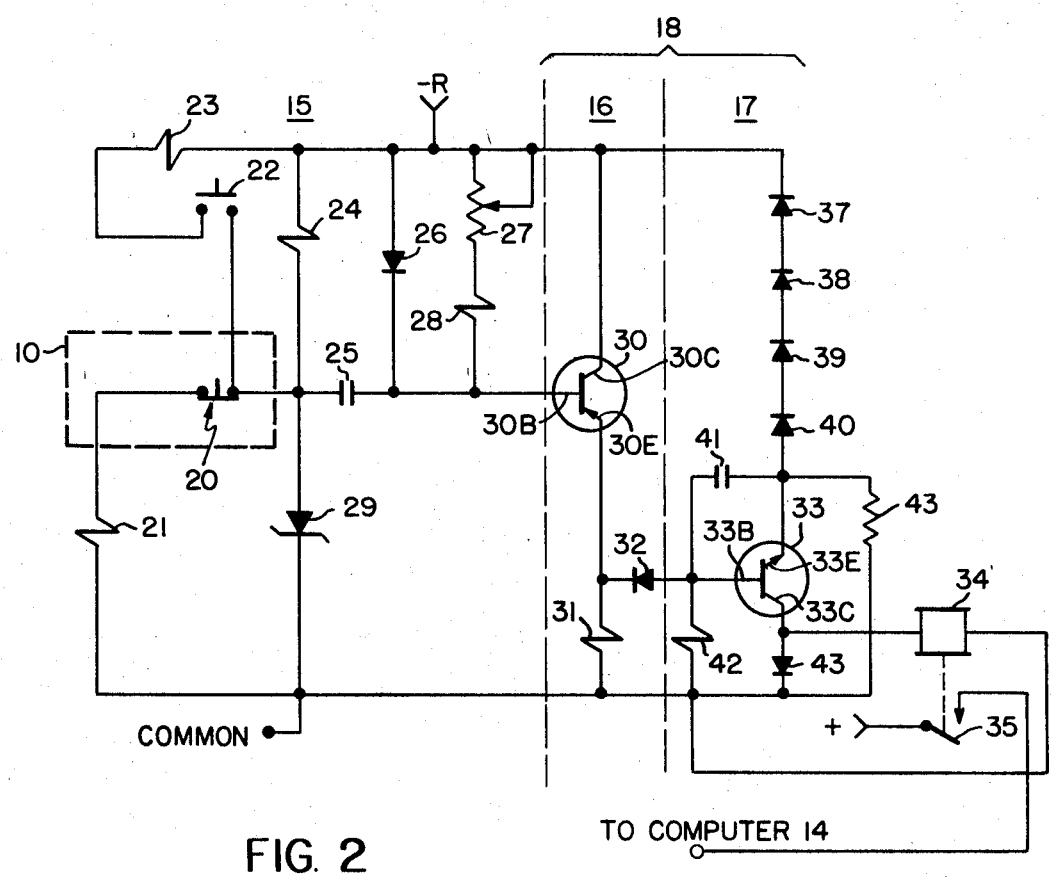
FIG. 2 is a detailed circuit diagram of the amplifier of FIG. 1.

Amplifier 13 may be described in detail with respect to FIG. 2. Wheel detector 10 comprises switch 20 which is normally closed. Load resistor 21 is located at a remote control station and completes that circuit of the wheel detector system. Switch 22 and resistor 23 form a test circuit manually operated at the control station for checking the operation of the amplifier 13. Wheel detector 10 activates timing circuit 15 which includes resistor 24 and capacitor 25, a timing network, and diode 26 which is used for proper current polarity. Potentiometer 27 and serially connected resistor 28 are also used in conjunction with timing operation. Zener diode 29 provides a proper bias level during the timing operation and limits the voltage load applied to the contacts of switch 20.

The buffer 16 operated in accordance with the timing stage 15 includes load resistor 31 and transistor 30, which is a conducting emitter-follower and in this embodiment provides a voltage at the anode of diode 32 essentially the same as seen on capacitor 25, but at a lower impedance level so as not to affect the characteristics of timer 15.

Output amplifier 17 includes transistor 33 which when activated amplifies the true signal from wheel detector 10 and picks up relay 34 operating contact 35. This combination acts as an interface with computer 14 and isolates the computer 14 from the output amplifier 17. The relay contact 35 is not connected electrically to the output circuit 17 thereby preventing noise coupling between the computer 14 and the output circuit 17. Diodes 37–40 act as a biasing means for transistor 33, and the use of the diodes 37–40 also provide for voltage regulation of the transistors 33. Capacitor 41 is included to further isolate transistor 33 from noise pulses produced in the circuitry.

Resistor 42 provides biasing for transistor 33. Diode 43 is included in this generation to suppress the voltage of relay 34 when it is deenergized by the cutoff transistor 33.

Figure 3:
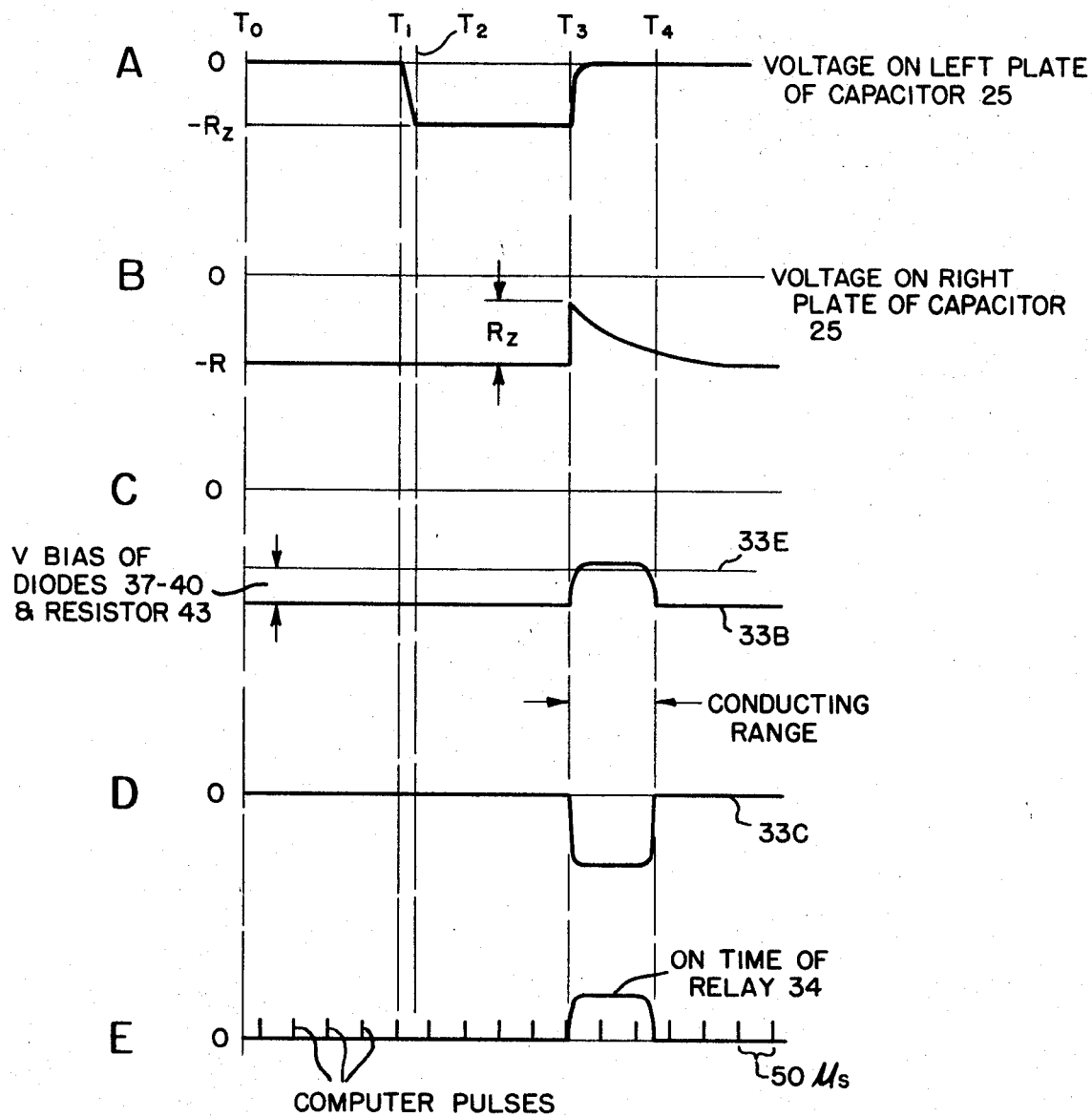
FIG. 3 is a waveform diagram with appropriate explanatory legends.

The operation of the circuit of FIG. 2 is described with reference to the waveform diagrams of FIG. 3. During off conditions, wheel contact 20 is normally closed as shown and capacitor 25 is charged negatively by a reference voltage R. The base 30B and the emitter 30E of transistor 30 under these conditions rest at approximately the reference voltage −R. Diode 32 is forward biased under these conditions and holds transistor 33 at cutoff so that output relay 34 is deenergized. Diodes 37–40 and resistor 43 maintain a bias on emitter 33E.

The voltage on emitter 30E follows the voltage on base 30B and must rise above this bias level before transistor 33 will turn on, picking up relay 34. When the wheel detector contact 20 opens, capacitor 25 is discharged through resistor 24 and diode 26. The discharge of capacitor 25 is limited by Zener diode 29 and when diode 29 conducts, the left side of capacitor 25 rests at approximately $-R_z$, a reference voltage for the Zener diode 29. The right side of capacitor 25 is clamped at approximately $-R$ volts by diode 26, maintaining a charge of $-(R-R_z)$ volts across the capacitor 25. During this interval the output transistor 33 remains cut off.

FIG. 3A shows the waveform on the left plate of capacitor 25. $T_0$ is any time before contact 20 is open-circuited. During this time, the left plate of capacitor 25 remains at 0 volts. At time $T_1$ contact 20 is open and capacitor 25 begins to discharge exponentially at a rate defined by a time constant $t_1$ which is the product of the values of resistor 24 and capacitor 25. The voltage on the left plate of capacitor 25 reaches voltage $-R_z$ at $T_2$, and remains at $-R_z$ because of Zener diode 29. The right plate of capacitor 25 shown in FIG. 3B, remains clamped at approximately $-R$ volts increasing negatively slightly over the discharge period between $T_1$ and $T_2$ (the time it takes for the left plate of capacitor 25 to reach $-R_z$ volts). After $T_2$ the right plate of capacitor 25 stabilizes at $-R$ volts. At $T_3$ contact 20 is closed by the passage of the wheel 12 and the left plate of capacitor 25 is quickly switched back to zero volt with the right plate following the charging rate of the left plate and achieving a jump of $-R_z$ volts as shown at $T_3$ in FIG. 3B. This jump in the positive direction is transmitted by emitter follower transistor 30 and consequently reverse biases diode 32, essentially taking it out of the circuit. The voltage of the base 33B has during all of this period been following approximately the fluctuations of the base 30B and emitter 30E of transistor 30 shown in FIG. 3C. The positive jump of capacitor 25 to which transistor 30 responds is followed by a positive jump in the voltage of base 33B through resistors 31 and 42. This jump is sufficient to overcome the reverse biasing of diodes 37–40 and resistor 43, turning on transistor 33.

Curve 3D shows the voltage on collector 33C. At all times the collector is cut off except during the period $T_3$-$T_4$. When transistor 33 is turned on, the collector conducts providing an output voltage sufficient to pick relay 35 for indicating through contact 35 that a wheel has truly been detected. After $T_3$, capacitor 25 begins to discharge and as soon as its charge decreases sufficiently, the base 33B voltage decreases below the cutoff point of transistor 33 and relay 34 drops away according to curve of 3D. The falling off time $T_4$-$T_3$ of the curve of FIG. 3B is determined by the time constant $t_2$ defined by the product of resistors (27+28) and capacitor 25. This time can be adjusted by varying the resistance of potentiometer 27.

What has been shown has merely been the presentation of how the device operates, however, timing in this procedure is extremely important and the value of $T_1$ and $T_2$, $T_3$ and $T_4$ are critical in the proper operation of a control system regulated by the wheel detection system. The duration of time that relay 34 is energized, i.e., ($T_4-T_3$) is important in this scheme, and must be long enough so that it will always be detected by computer 14.

A digital computer 14 is contemplated in this system and is arranged so hat it scans contact 35 of relay 34, 20 times a second, or once every 50 milliseconds. In order that a pulse indicating ON TIME of relay 34, shown in FIG. 3E will be detected, the pulse must be somewhat longer than 50 milliseconds, so that the ON TIME pulse length will cover with at least one of the scanning pulses of computer 14. The value $t_2$ is arranged such that the decay time of a charge equivalent to $R_z$ volts on resistors 27 and 28 and capacitor 25 is long enough to keep transistor 33 on slightly longer then 50 milliseconds, so that the ON TIME pulse will be sensed by the computer 14 scan pulse.

As indicated earlier, timer circuit 15 is used to discriminate true wheel pulse signals from false transients. If a scanning pulse occurs once every 50 milliseconds, it is possible for a noise pulse to simultaneously be present when a scan pulse from the computer 14 is present. However, by eliminating most of the noise transients, the probability of this occurring is reduced to small factor. In order for transistor 33 to be turned on, magnitude of the delayed signal must be of such a value to drive the base 33B above a threshold value set by the bias of diodes 37–40 and resistor 43. The time constant $t_1$ defined by resistor 24 and capacitor 25 can be arranged such that the time it takes for capacitor 25 to discharge by, for example, a 2 value, which is less than the bias in transistor 33, would be approximately 5 milliseconds. Since most transients are less than 2 milliseconds, the danger of a random signal is brought to a minimum. In the event a transient lasted longer than 2 milliseconds, the output pulse would be of extremely short duration. This is because capacitor 25 will discharge quickly when charged to a small value. Assuming the 5 millisecond output pulse on relay 34 an 50 milliseconds between scanning pulses, the probability of a miscount is virtually nonexistent.

For a more complete understanding of the present invention, a typical operational sequence is described with reference to the drawings.

Wheels 12 activate the wheel detector 10 as they roll over it. A signal is transmitted to timer 15 which produces an integrated signal at its output with a magnitude proportional to the duration of the input signal. This integrated signal is transmitted to the output stage 18 and if it is greater than a predetermined threshold, it activates the output stage 18 which produces an output signal indicative of wheel presence. The parameters of the timing stage are chosen so that noise signals of very short duration when integrated will have a magnitude of less than the threshold.

When wheel detector 10 is depressed at time $T_1$ by a passing wheel, the left plate of capacitor 25 begins to charge to a reference voltage ($-R_z$). At time $T_2$ the left plate of capacitor 25 is charged at $-R_z$ and ceases charging because the Zener diode 29 has established across its terminals a potential equal to $-R_z$. The time $T_2-T_1$ is a short interval, perhaps 5 milliseconds.

At time $T_3$, the wheel has passed by the detector 10 and switch 20 has closed. The charge in the left plate of capacitor 25 quickly discharges through resistor 21 to zero volts. Up to this time, ($T_3$) the voltage on the right plate of capacitor 25 has remained essentially at $-R$ volts because of clamping by diode 26. However, when the switch 20 is closed, the left plate of capacitor 25 charges by an amount $-R_z$ relative to the discharge of the left plate. This $-R_z$ jump in voltage in the right plate of capacitor 25 is enough to forward bias diodes 37–40 and reverse bias diode 32 through buffer transistor 30. The buffer transistor 30 is an emitter-follower, with high input and low output impedances, which match the timer 15 and output amplifier 17 output and input impedances respectively. The gain of buffer 16 is unity or less; however, the use of the buffer 16 for isolation and impedance matching provides for maximum signal transfer from one stage to the next.

As previously mentioned, the forward and reverse biasing of diodes 37–40 and 32 respectively, cause transistor 33 to turn on and produce a current in collector 33C for energizing relay 34. The relay 34 picks up contact 35 which is coupled to computer 14, an the signal indicative of wheel presence is thereby produced by the output stage 18.

If the switch 20 is not activated, but a strong noise signal finds its way into the amplifier 13 and if the noise signal is short in duration relative to signals produced by switch 20, then no output signal will be produced. The noise signal if of a short duration, e.g., in the order of 5 milliseconds or less, will not sufficiently charge capacitor 25. The pulse length of the noise generally encountered is usually less than 5 milliseconds and the values of capacitor 25 and resistor 24 are chosen such that the time constant $t_1$, associated with that combination of elements is long with respect to noise and short with respect to true signals produced by the wheel detector 20. The relative time duration of noise and true signals provides for the assurance of accurate wheel detection.

Under certain circumstances, a series of short duration noise pulses could cause the generation of an output signal indicative of wheel presence. Capacitor 25 having a finite discharge time retains some of the charge introduced by noise pulses for a short period of time after the noise pulse disappears. If a second noise pulse follows the first pulse in rapid succession, the charge introduced by the second noise pulse plus the residual charge of the first noise pulse may be enough to exceed the threshold of the output stage. A series of short duration pulses produced in rapid succession could cumulatively charge the capacitor 25 to such a potential that an output signal indicative of wheel presence would be produced. While the probability of such an occurrence is unlikely, such an event would result in an erroneous output signal being generated. However, one erroneous signal caused by a number of noise pulses is more desirable than having each noise pulse register a count. In this respect then the system provides noise protection of a substantial nature.

The amplifier described in the preceding discussion provides for accurate wheel detection by discriminating true wheel detector signals from noise. The amplifier utilizes a timing circuit for producing signals relative to the duration of input signals. An output stage coupled to the timer having a threshold value relative to a minimum input signal duration generates an output signal indicative of wheel presence whenever the timing circuit signal has a value greater than the threshold value.

While there has been described what is at the present considered to be the preferred embodiment of the present invention, it will be obvious to those skilled in the art that various changes and modifications may be made.

What We claim is:

1. An improved amplifier responsive to a wheel detector generating signals indicating wheel presence wherein the improvement for discriminating true wheel detector signals from noise comprises:
   a timing circuit for producing signals relative to the duration of wheel detector signals; and
   an output stage coupled to the timing circuit for generating an output signal whenever the timing circuit delivers its signal with a value greater than a minimum duration comparable to anticipated wheel detector signals including:
   a buffer responsive to the signals of the timing stage; and
   a primary amplifier responsive to the signal of greater than a minimum amplitude for generating the output signal;
   the buffer coupled between the primary amplifier and the timing circuit being effective to isolate the timing circuit from the primary amplifier and matching impedance levels of the timing circuit and the primary amplifier.

2. The improved amplifier of claim 1 wherein the timing circuit includes:
   impedance means including, resistive and capacitive energy storage elements charged by the wheel detector signals for producing the timing circuit signals; the impedance means having a predetermined charging time; and
   wherein the amplitude of the timing circuit signal is directly dependent upon the duration of the wheel detector signals, and the wheel detector signal must have greater than a predetermined amplitude an duration in order for the timing circuit to attain the threshold.

3. The improved amplifier of claim 2 wherein the impedance means producing the timing circuit signals has a predetermined discharging time, the duration of the output signal is directly dependent on said discharge time, and the impedance means defines said charging and discharging time.

4. The improved amplifier of claim 3 wherein the energy storage elements have a bias potential applied thereto and further comprise a first resistor, a capacitor serially connected to said resistor, said first resistor an capacitor defining the charging time; and a second resistor connected in parallel across said first resistor and capacitor for defining the discharge time; and a diode connected in parallel across said first resistor an capacitor in a forward bias direction relative to charge stored on said capacitor and reverse bias relative to the imposed bias potential for providing said energy storage elements with a low impedance discharge path in the forward bias direction of said diode in accordance with one polarity of said capacitor.

5. The improved amplifier of claim 1 wherein the buffer comprises:
   a secondary amplifier connected to the timing circuit and responsive thereto;
   the secondary amplifier coupling the signals from the timing circuit to the output amplifier; and
   the secondary amplifier having low gain and high input impedance for isolating the timing circuit from the output stage.

6. The improved amplifier of claim 5 wherein the primary amplifier comprises:
   an output amplifier connected to the buffer and responsive to the timing circuit signals for amplifying said signals;
   biasing means establishing the input response of the output amplifier between a cutoff and a conductance state, said output amplifier gating the signal produced by the timing circuit in accordance with said conductance states; and
   the output amplifier operated to a conducting state when the timing circuit signal exceeds the predetermined minimum threshold.

7. The improved wheel detector amplifier of claim 6 wherein the output amplifier includes:
   energy storage means coupling the input and output of the output amplifier, providing additional discrimination for preventing signals below the minimum time duration from being transmitted as output signals indicative of wheel presence.

8. An improved amplifier responsive to wheel detector signals wherein the improvement for discriminating true wheel detector signals from noise comprises:
   a. a timing circuit for producing signals relative to the duration of input signals including;
   two resistors;
   a capacitor serially connected between each of the resistors, the resistors connected at their other terminals to each other and a first reference potential; the two resistors and the capacitor form a network having a predetermined charging and discharging time;
   a first diode having its cathode connected to one plate of the capacitor and its anode connected to the junction formed by the two resistors, said junction being biased at a first reference potential, whereby said first diode is reverse biased relative to the first reference potential and forward biased relative to a charge stored on said capacitor;
   a Zener diode having its anode connected to the other plate of the capacitor and its cathode connected to a common potential, said Zener diode for limiting the bias of said anode connection to the breakdown voltage of said Zener diode; and
   b. an output stage, having a threshold value relative to a minimum input signal duration, coupled to the timing circuit, the output stage generating an output signal whenever the timing circuit signal has a value greater than the threshold value, including:
   a buffer responsive to the signals of the timing stage comprising a first transistor of one junction type, an emitter-resistor connected between the common potential and the emitter of the first transistor, a second diode having its cathode connected to the emitter of said first transistor in a manner forward biased relative to the emitter base junction, the base of the first transistor connected to the cathode of the first diode of the timer, and the collector of the first transistor connected to the anode of the first diode of the timer; and
   an output amplifier responsive to the signal of greater than minimum threshold for generating the output signal comprising a second transistor of opposite junction type to the first transistor, a plurality of diodes serially connected anode to cathode to the emitter the second transistor in a manner forward biased relative to the base emitter junction of said transistor for biasing the transistor, said serially coupled diodes connected to the anode of the first diode, a coupling capacitor connected across the emitter base junction of the second transistor, a resistor connected between the base of the second transistor and the common potential, the second diode connected at its anode to the base of the second transistor, said second diode being forward biased and coupling the emitter of the first transistor to the base of the second transistor, for holding the second transistor in a nonconductance state, and reversed biased when the timing circuit signal reaches the predetermined threshold for permitting the second transistor to conduct, a biasing resistor connected between the emitter of the second transistor and the common potential, an output relay coupled to the collector of the second transistor and the common potential energized in accordance with the conductance state of said second transistor, generating the output signal when energized for indicating said true wheel detector signal, and a third diode coupled across said output relay connected at its anode to the collector of transistor and at its cathode to the common potential, for preventing feedback from relay when said transistor is switched to a nonconductance state.